United States Patent
Nagahashi et al.

(10) Patent No.: US 12,496,005 B2
(45) Date of Patent: Dec. 16, 2025

(54) DROWSINESS DETECTION DEVICE

(71) Applicant: YAZAKI CORPORATION, Tokyo (JP)

(72) Inventors: Kenichi Nagahashi, Susono (JP); Jungang Guan, Susono (JP)

(73) Assignee: YAZAKI CORPORATION, Tokyo (JP)

(*) Notice: Subject to any disclaimer, the term of this patent is extended or adjusted under 35 U.S.C. 154(b) by 287 days.

(21) Appl. No.: 18/516,923

(22) Filed: Nov. 21, 2023

(65) Prior Publication Data

US 2024/0188869 A1   Jun. 13, 2024

(30) Foreign Application Priority Data

Dec. 12, 2022   (JP) ................. 2022-197908

(51) Int. Cl.
*A61B 5/18*   (2006.01)
*A61B 5/00*   (2006.01)
*A61B 5/11*   (2006.01)
*G06V 20/59*   (2022.01)
*G06V 40/18*   (2022.01)

(52) U.S. Cl.
CPC .............. *A61B 5/18* (2013.01); *A61B 5/0077* (2013.01); *A61B 5/1103* (2013.01); *G06V 20/597* (2022.01); *G06V 40/18* (2022.01)

(58) Field of Classification Search
CPC ......... A61B 5/18; G06V 20/597; G06V 40/18
See application file for complete search history.

(56) References Cited

U.S. PATENT DOCUMENTS

| | | | | |
|---|---|---|---|---|
| 5,786,765 | A * | 7/1998 | Kumakura | G08B 21/06 340/576 |
| 8,836,777 | B2 * | 9/2014 | Mehra | G06V 40/18 348/78 |
| 12,136,279 | B2 * | 11/2024 | Nagahashi | G06V 40/166 |
| 2012/0218398 | A1 * | 8/2012 | Mehra | G06V 40/176 348/78 |
| 2012/0219180 | A1 * | 8/2012 | Mehra | G06F 3/013 382/103 |
| 2020/0286358 | A1 * | 9/2020 | Doi | B60W 50/14 |
| 2021/0004619 | A1 * | 1/2021 | Qin | G06F 18/24 |
| 2021/0241011 | A1 * | 8/2021 | Cronje | G06T 7/70 |
| 2022/0160276 | A1 * | 5/2022 | Suzuki | G08B 21/06 |

(Continued)

FOREIGN PATENT DOCUMENTS

| | | |
|---|---|---|
| JP | H10-40481 A | 2/1998 |
| JP | 2022-42248 A | 3/2022 |

*Primary Examiner* — Hoi C Lau
(74) *Attorney, Agent, or Firm* — KENEALY VAIDYA LLP

(57) ABSTRACT

A drowsiness detection device includes a PERCLOS calculation unit, a drowsiness detection unit, and a threshold value setting unit. The PERCLOS calculation unit calculates, based on an image imaged by a camera, a PERCLOS that is a ratio of a time period during which a driver closes an eye within a certain time period. The drowsiness detection unit detects drowsiness of the driver when the PERCLOS is equal to or larger than a threshold value. The threshold value setting unit sets the threshold value to be smaller than in a case that an initial ratio of deep blinking is equal to or larger than a % when an initial ratio of deep blinking first calculated from a start of driving is less than a %.

6 Claims, 7 Drawing Sheets

(56) References Cited

U.S. PATENT DOCUMENTS

| | | | |
|---|---|---|---|
| 2024/0000355 A1* | 1/2024 | Okayama | A61B 5/7275 |
| 2024/0188869 A1* | 6/2024 | Nagahashi | A61B 5/18 |
| 2024/0193967 A1* | 6/2024 | Nagahashi | G06V 40/19 |

* cited by examiner

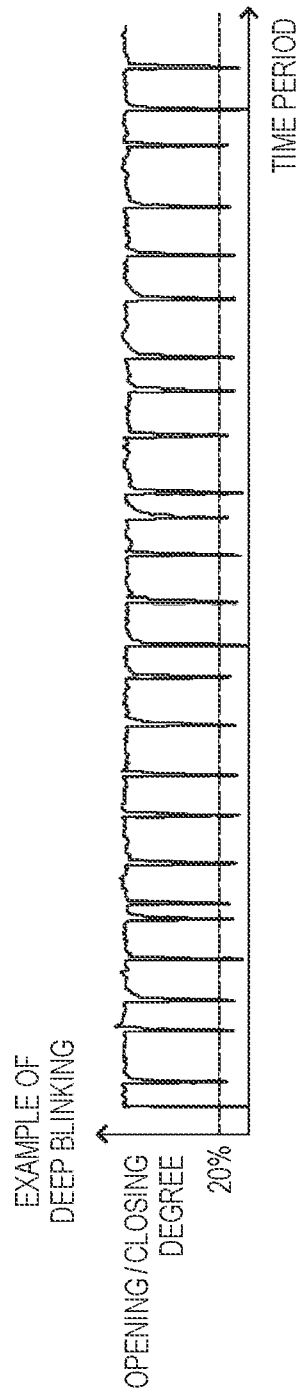
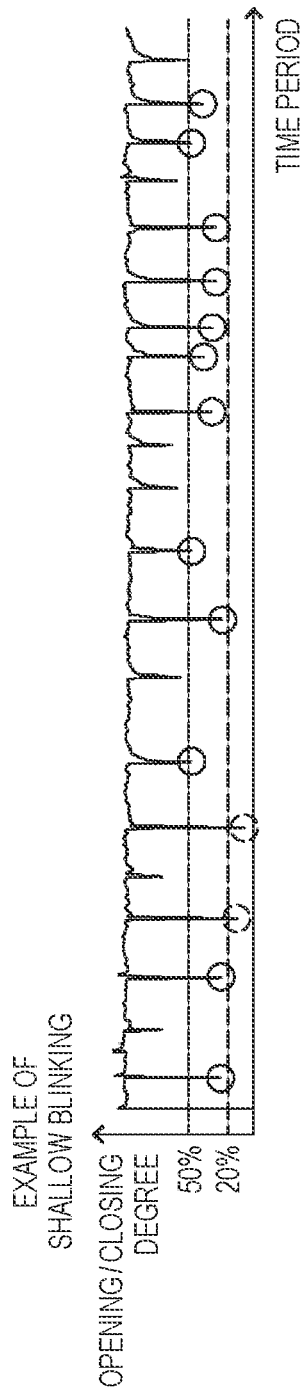
FIG. 4
FIG. 5

DROWSINESS DETECTION DEVICE

CROSS-REFERENCE TO RELATED APPLICATIONS

This application is based on and claims priority under 35 USC 119 from Japanese Patent Application No. 2022-197908 filed on Dec. 12, 2022, the contents of which are incorporated herein by reference.

TECHNICAL FIELD

The present invention relates to a drowsiness detection device and a drowsiness detection method.

BACKGROUND ART

One of indices for measuring a fatigue degree of a driver of a vehicle such as an automatic vehicle is percent of eye lid closure (PERCLOS) (Patent Literature 1). PERCLOS is a time period ratio during which the driver closes an eye per minute. When PERCLOS is equal to or larger than a threshold value, drowsiness can be detected. However, there is a problem that there is a personal difference in PERCLOS when the driver feels drowsiness, and if the threshold value is uniformly set, it is difficult to accurately detect drowsiness.

Therefore, it is conceivable to make the threshold value to be optionally changeable by the driver by applying a technique described in Patent Literature 2. However, when the driver changes the threshold value, it is necessary to confirm the past PERCLOS history and threshold value, and the threshold value may not be changed due to an annoyance or may not be set to an appropriate threshold value.

CITATION LIST

Patent Literature

Patent Literature 1: JP2022-42248A
Patent Literature 2: JPH10-40481A

SUMMARY OF INVENTION

The present invention has been made in view of the above circumstances, and an object thereof is to provide a drowsiness detection device and a drowsiness detection method capable of improving detection accuracy of drowsiness.

In order to implement the above object, a drowsiness detection device according to the present invention has the following features.

In order to implement the above object, a drowsiness detection method according to the present invention has the following features.

According to the present invention, it is possible to provide a drowsiness detection device and a drowsiness detection method capable of improving detection accuracy of drowsiness.

The present invention has been briefly described above. Further, details of the present invention can be clarified by reading modes for carrying out the invention (hereinafter, referred to as "embodiments") described below with reference to the accompanying drawings.

BRIEF DESCRIPTION OF DRAWINGS

FIG. 4 is a time chart illustrating opening and closing of an eye of a person who performs deep blinking;

FIG. 5 is a time chart illustrating opening and closing of an eye of a person who performs shallow blinking;

DESCRIPTION OF EMBODIMENTS

Specific embodiments of the present invention will be described below with reference to the drawings.

Figure 1:
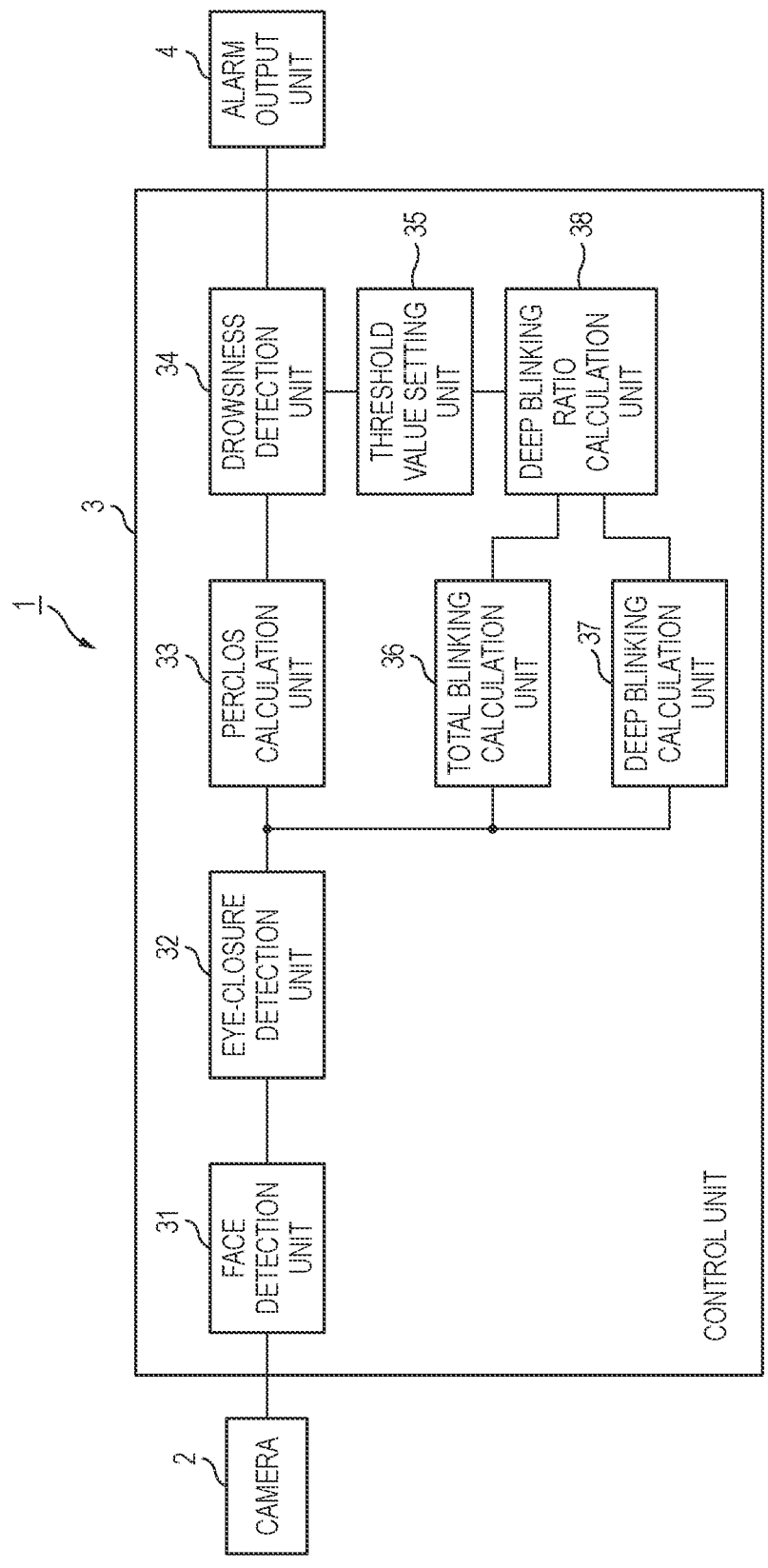
FIG. 1 is a block diagram illustrating a drowsiness detection device according to a first embodiment of the present invention.

A drowsiness detection device 1 according to the present embodiment illustrated in FIG. 1 is a device that is mounted in a vehicle and detects drowsiness of a driver who is a detection target person sitting in a driver seat. As illustrated in FIG. 1, the drowsiness detection device 1 includes a camera 2 serving as an imaging unit, a control unit 3, and an alarm output unit 4.

The camera 2 is installed in a meter unit in front of the driver seat or is installed at a column cover in a manner that a face of the driver sitting in the driver seat can be imaged. The camera 2 provides an imaged image of the face of the driver to the control unit 3 described later.

The control unit 3 includes a well-known microcomputer including a central processing unit (CPU), a read only memory (ROM), a random access memory (RAM), and the like, and functions as a computer that operates according to a drowsiness detection program or method. The control unit 3 includes a face detection unit 31, an eye-closure detection unit 32, a PERCLOS calculation unit 33 serving as a first calculation unit, a drowsiness detection unit 34, a threshold value setting unit 35, a total blinking calculation unit 36 serving as a second calculation unit, a deep blinking calculation unit 37 serving as a third calculation unit, and a deep blinking ratio calculation unit 38 serving as a fourth calculation unit.

Figure 2:
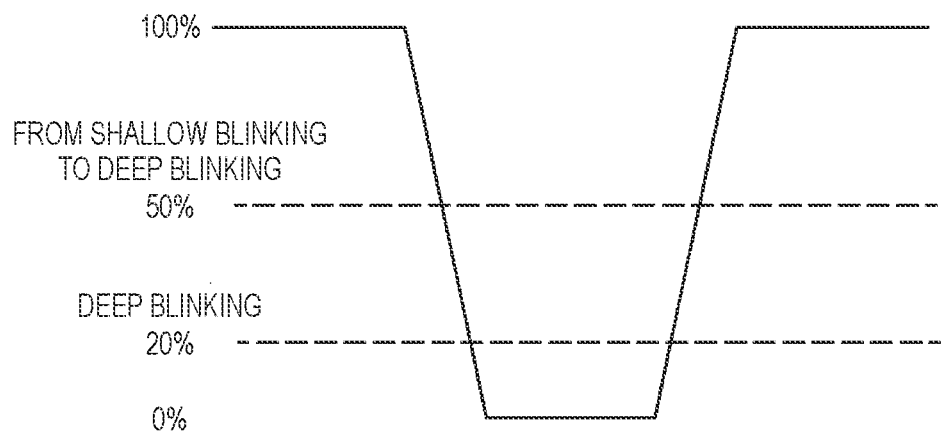
FIG. 2 is a time chart illustrating a function of an eye-closure detection unit illustrated in FIG. 1.

The face detection unit 31 extracts a face image from the image imaged by the camera 2. The eye-closure detection unit 32 obtains an opening/closing degree of an eye from the face image detected by the face detection unit 31, and detects eye-closure (blinking) from the opening/closing degree. In the present embodiment, as illustrated in FIG. 2, when specifying that the opening/closing degree of 100% is fully opened and the opening/closing degree of 0% is fully closed, the eye-closure detection unit 32 detects from shallow blinking to deep blinking with an opening/closing degree of 50% (a first predetermined value) or less, and provides the result to the total blinking calculation unit 36. The eye-closure detection unit 32 detects the deep blinking having an opening/closing degree of 20% (a second predetermined value) or less, and provides the result to the PERCLOS calculation unit 33 and the deep blinking calculation unit 37.

Figure 3:
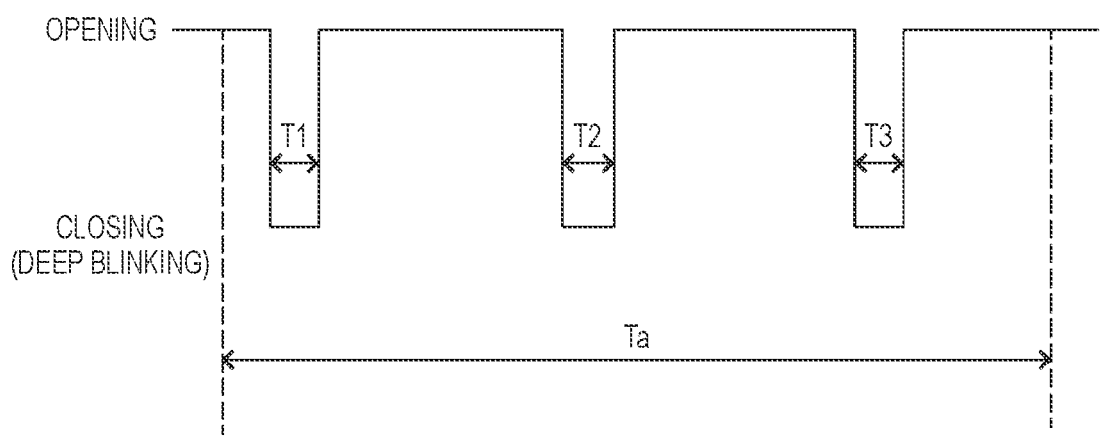
FIG. 3 is a time chart illustrating a function of a PERCLOS calculation unit illustrated in FIG. 1.

As illustrated in FIG. 3, the PERCLOS calculation unit 33 calculates, based on the detection result of the deep blinking from the eye-closure detection unit 32, a PERCLOS expressed by the following equation (1) as a drowsiness index value.

$$PERCLOS=(T1+T2+T3)/Ta\times100\% \quad (1)$$

PERCLOS is a ratio of a time period (T1+T2+T3) during which the driver closes the eye within a certain time period Ta (=a first predetermined time period). The PERCLOS calculation unit 33 calculates the PERCLOS every certain time period Ta.

The drowsiness detection unit 34 detects drowsiness of the driver when the PERCLOS is equal to or larger than a threshold value, and causes the alarm output unit 4 to generate an alarm. The threshold value setting unit 35 will be described later. The total blinking calculation unit 36 calculates a number of times of blinking having an opening/closing degree of 50% or less within the certain time period Ta (a second predetermined time period) as a total number of times of blinking n1, and provides the calculation result to the deep blinking ratio calculation unit 38. The deep blinking calculation unit 37 calculates a number of times of deep blinking having an opening/closing degree of 20% or less within the certain time period Ta as a number of times of deep blinking n2, and provides the calculation result to the deep blinking ratio calculation unit 38.

The deep blinking ratio calculation unit 38 calculates the ratio of the number of times of deep blinking n2 to the total number of times of blinking n1 as the ratio of deep blinking as illustrated in the following equation (2).

$$\text{Ratio of deep blinking}=n2/n1 \quad (2)$$

For example, in a case of a person who performs deep blinking as illustrated in FIG. 4, all of blinking is deep blinking having an opening/closing degree of 20% or less, and thus a ratio of deep blinking is 100%. With respect to this, in a case of a person who performs shallow blinking as illustrated in FIG. 5, as surround by a dotted line circle, a number of times of deep blinking having an opening/closing degree of 20% or less is 2, and as surround by a solid line circle and the dotted circle, a total number of times of blinking having an opening/closing degree of 50% or less is 14. Therefore, as illustrated in the following equation (3), a ratio of deep blinking is as small as 14.3%.

$$\text{Ratio of deep blinking}=2/14=14.3\% \quad (3)$$

The threshold value setting unit 35 sets the threshold value based on a ratio of deep blinking calculated with a first certain time period Ta after a start of driving is detected (after a predetermined trigger).

The alarm output unit 4 includes an indicator such as a meter display, a navigation monitor, or a head-up display, and notifies the driver that drowsiness is detected or a rest is recommended by sound, voice, characters, icons, or the like.

Next, operations of the drowsiness detection device 1 described above will be described with reference to a flowchart illustrated in FIG. 6. First, when the start of driving is detected, the control unit 3 resets the threshold value used for the drowsiness detection described above (that is, makes an initial state). The control unit 3 detects the start of driving when an ignition switch is turned on, for example.

Figure 6:
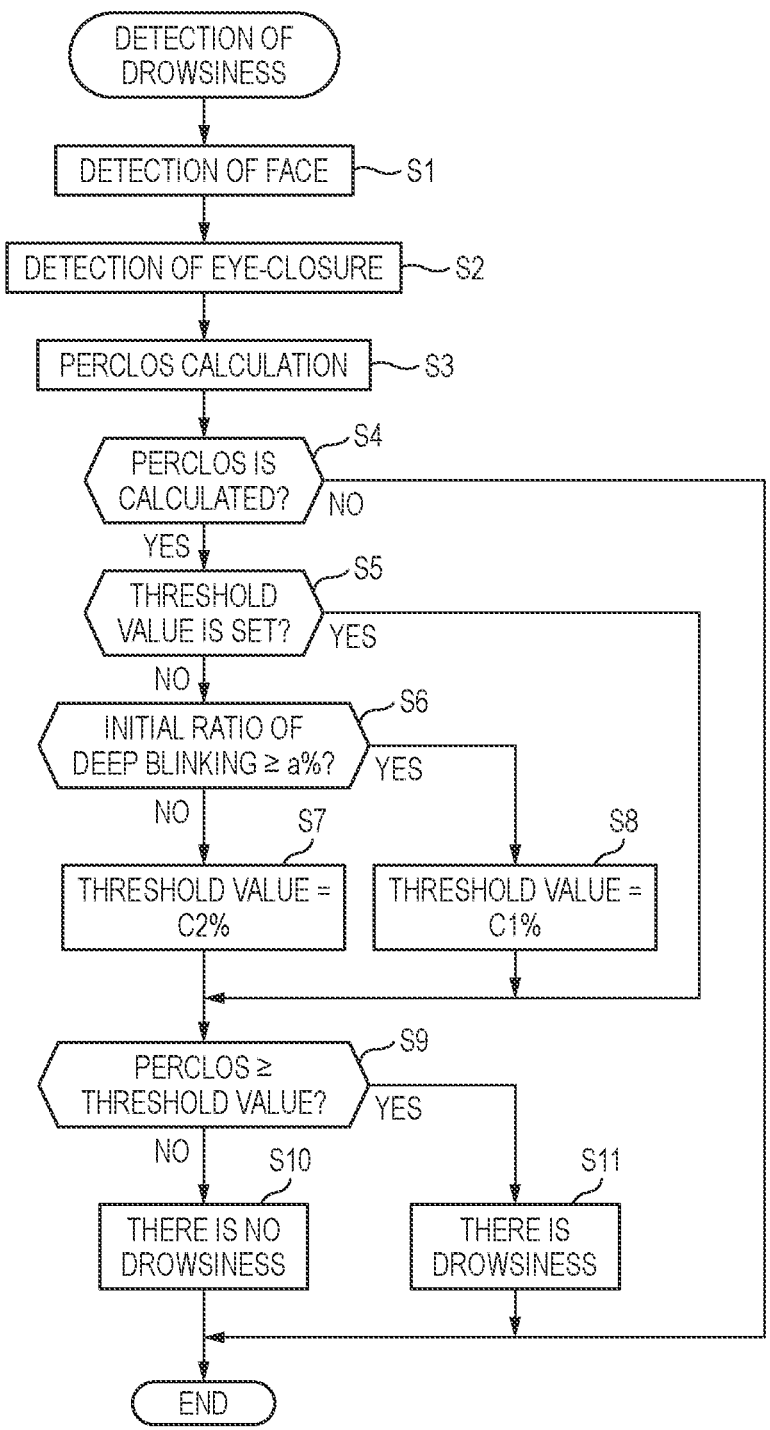
FIG. 6 is a flowchart illustrating operations of the drowsiness detection device illustrated in FIG. 1.

The control unit 3 repeatedly performs the drowsiness detection processing illustrated in FIG. 6 each time an image of one frame imaged by the camera 2 is provided. In the drowsiness detection processing, the control unit 3 extracts the face image from the imaged image from the camera 2 (S1). Next, the control unit 3 obtains the opening/closing degree of the eye from the face image detected by the face detection unit 31, and detects blinking having an opening/closing degree of 50% or less and blinking having an opening/closing degree of 20% or less based on the opening/closing degree (S2). Next, when the blinking is detected in S2, the control unit 3 counts up a time period during which the driver closes the eye, and calculates the PERCOLS based on the time period counted up when the certain time period Ta elapses (S3).

In a case that the certain time period Ta does not elapses and the PERCLOS is not calculated (N in S4), the control unit 3 ends the processing. In a case that the certain time period Ta elapses and the PERCLOS is calculated (Y in S4), the control unit 3 determines whether the threshold value is set (S5). In a case that the threshold value is set (Y in S5), the control unit 3 proceeds to S9 immediately.

In a case that the threshold value is not set (N in S5), the control unit 3 determines whether an initial ratio of deep blinking calculated with a first certain time period Ta after the start of driving is equal to or larger than a % (a third predetermined value) (S6). In a case in which the initial ratio of deep blinking is equal to or larger than a % (Y in S6), the control unit 3 sets the threshold value to C1% (S8), and then proceeds to S9. In a case in which the initial ratio of deep blinking is less than a % (N in S6), the control unit 3 sets the threshold value to C2% which is smaller than C1% (S7), and then proceeds to S9.

In S9, in a case in which the PERCLOS calculated in S3 is equal to or larger than the threshold value (Y in S9), the control unit 3 determines that there is drowsiness (S11), controls the alarm output unit 4 to generate an alarm, and then ends the processing. In a case in which the PERCLOS calculated in S3 is less than the threshold value (N in S9), the control unit 3 determines that there is no drowsiness (S10), and ends the processing.

Figure 7:
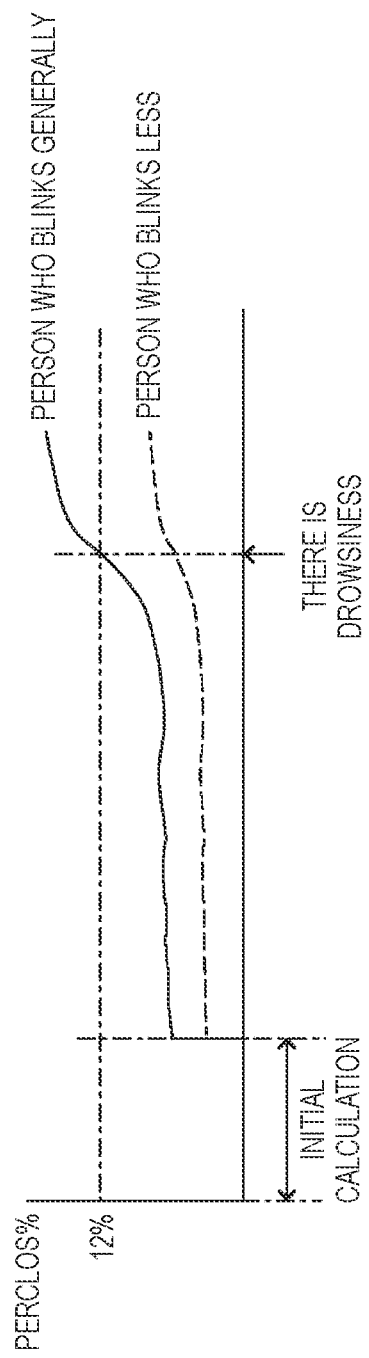
FIG. 7 is a time chart illustrating PERCLOS of a person who blinks generally and a person who blinks less.

As illustrated in FIG. 4, a person who performs deep blinking is high in PERCLOS, and as illustrated in FIG. 5, a person who performs shallow blinking is low in PERCLOS and the eye-closure cannot be detected. As illustrated in FIG. 7, even if the number of times of blinking of a person who blinks less or performs shallow blinking is slightly increased when becomes drowsy, the PERCLOS does not increase too much compared with a person who blinks generally. If the threshold value is uniformly set to, for example, 12% as in the related art, it is impossible to detect drowsiness of the person who blinks less or performs shallow blinking.

According to the embodiment described above, the control unit 3 sets the threshold value to be smaller in a case in which the initial ratio of deep blinking is less than a % than in a case in which the initial ratio of deep blinking is equal to or larger than a % (C1>C2). That is, the person who performs shallow blinking has an initial ratio of deep blinking that is less than a %, and thus the threshold value can be set to be smaller than the threshold value corresponding to the person who blinks generally. Accordingly, the threshold value suitable for the driver can be set, and the detection accuracy of drowsiness can be improved.

According to the embodiment described above, the detection of the start of the driving is the predetermined trigger. Accordingly, the threshold value can be determined based on an initial ratio of deep blinking close to that in the case of awakening, and the detection accuracy of drowsiness can be further improved.

Second Embodiment

Next, a drowsiness detection device 1B according to a second embodiment will be described with reference to FIG.

Figure 8:
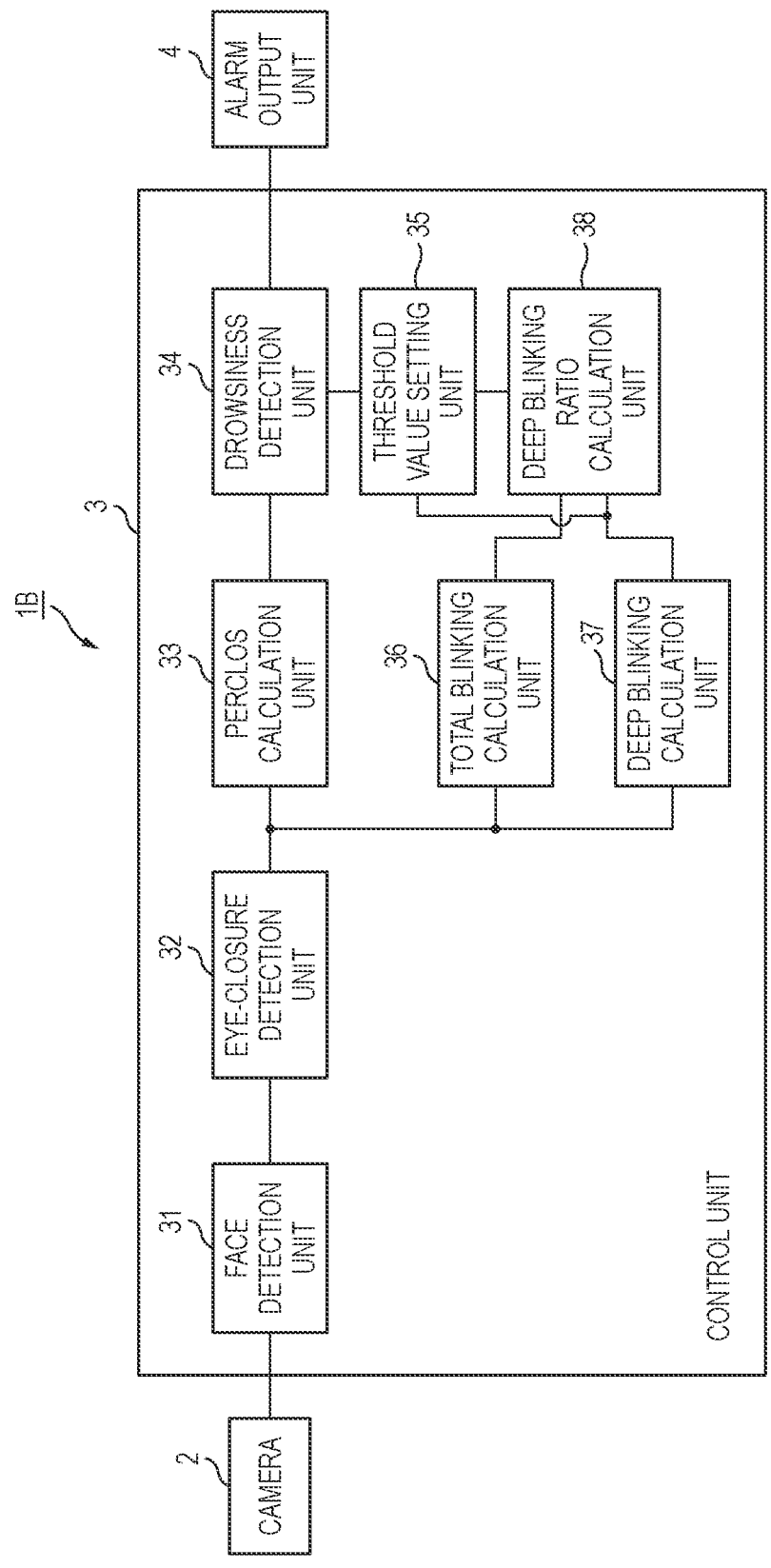
FIG. 8 is a block diagram illustrating a drowsiness detection device according to a second embodiment of the present invention.

8. In FIG. 8, portions equivalent to those of the drowsiness detection device 1 illustrated in FIG. 1 already described in the first embodiment are denoted by the same reference numerals, and detailed descriptions thereof are omitted. The drowsiness detection device 1B according to the second embodiment differs from the drowsiness detection device 1 according to the first embodiment in that the threshold value setting unit 35 sets the threshold value based on the ratio of deep blinking and the number of times of deep blinking calculated with the first certain time period Ta after the start of driving.

Figure 9:
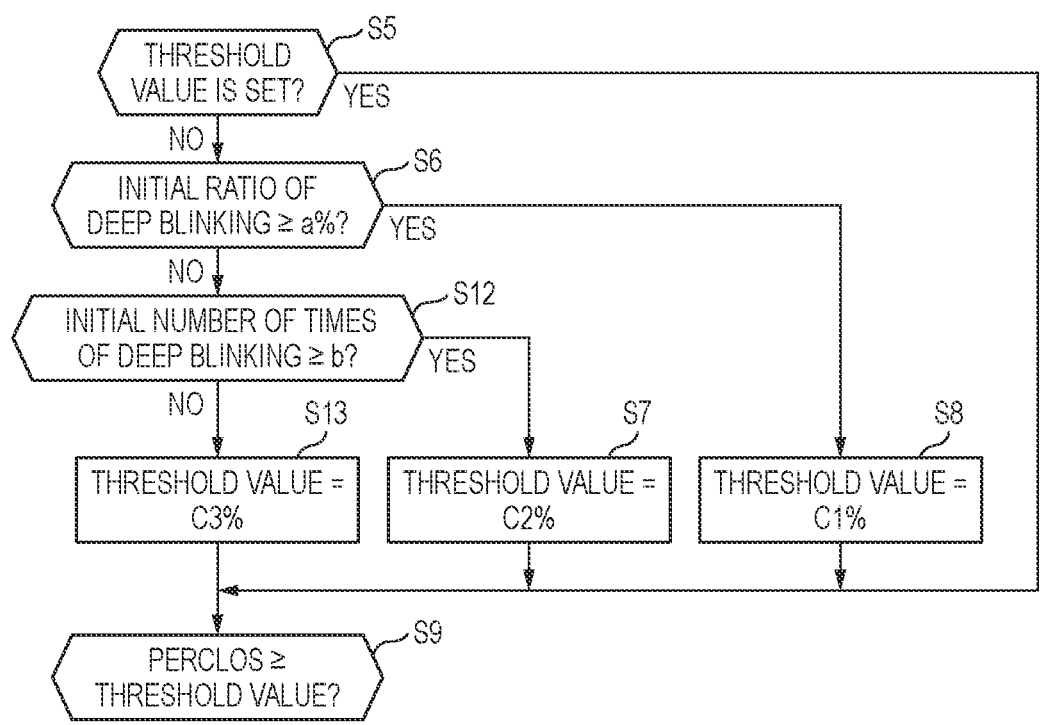
FIG. 9 is a flowchart illustrating operations of the drowsiness detection device illustrated in FIG. 8.

Next, operations of the drowsiness detection device 1B according to the second embodiment will be described with reference to a flowchart illustrated in FIG. 9. In FIG. 9, steps of performing the same operations as those of the flowchart illustrated in FIG. 6 already described in the first embodiment are omitted, and the detailed descriptions thereof are omitted.

In drowsiness detection processing, the control unit 3 performs operations of S1 to S6 as in the first embodiment. In S6, the control unit 3 determines whether an initial ratio of deep blinking is equal to or larger than a % (a predetermined value) (S6). In a case in which the initial ratio of deep blinking is equal to or larger than a % (Y in S6), the control unit 3 sets the threshold value to C1% (S8), and then proceeds to S9. In a case in which the initial ratio of deep blinking is less than a % (N in S6), the control unit 3 determines whether an initial number of times of deep blinking calculated within a first certain time period Ta after the start of driving is equal to or larger than b (a predetermined number of times) (S12).

In a case in which the initial number of times of deep blinking is equal to or larger than b (Y in S12), the control unit 3 sets the threshold value to C2% which is smaller than C1% (S7), and then proceeds to S9. In a case in which the initial number of times of deep blinking is less than b (N in S12), the control unit 3 sets the threshold value to C3% which is smaller than C2% (S13), and then proceeds to S9. S9 and subsequent steps are the same as those in the first embodiment, and thus descriptions thereof are omitted.

For a person whose number of times of blinking is counted to some extent, the PERCLOS increases slightly when drowsiness becomes strong, but for a person whose number of times of blinking is hardly counted, the PERCLOS does not increase too much even when drowsiness becomes strong.

According to the embodiments described above, the control unit 3 sets the threshold value to be smaller in a case in which the initial ratio of deep blinking is less than a % and the initial number of times of deep blinking is less than b than in a case in which the initial ratio of deep blinking is less than a % and the initial number of times of deep blinking is equal to or larger than b (C2>C3). Accordingly, a person who has a small number of times of blinking belongs to those whose number of times of blinking is less than b, and the threshold value can be set to be smaller as compared with a person who has a large number of times of blinking. Accordingly, the detection accuracy of drowsiness can be further improved. C2 and C3 may be obtained with the following equation by using the ratio of deep blinking ($\alpha$) and the total number of times of blinking ($\beta$) as parameters.

$$\text{Threshold value} = (n/\beta) \times \alpha \quad (2)$$

Next, in order to confirm effects of the first and second embodiments, the present inventors measured the initial ratio of deep blinking twice for each of subjects A to E (detection target persons), a drowsiness level when drowsiness becomes strong was obtained by self-reporting, and threshold values and detections results of a related drowsiness detection device, the drowsiness detection device 1 according to the first embodiment, and the drowsiness detection device 1B according to the second embodiment were summarized in Table 1 below.

TABLE 1

| Subject | Initial Ratio of deep blinking | Initial Number of times of deep blinking | Related Threshold value | First Threshold value | Second Threshold value | When drowsy PERCLOS | Related | First | Second |
|---|---|---|---|---|---|---|---|---|---|
| A1 | 92.7 | — | 12% | 12% | 12% | 37.1 | ○ | ○ | ○ |
| A2 | 97.5 | — | 12% | 12% | 12% | 30.1 | ○ | ○ | ○ |
| B1 | 71.6 | — | 12% | 12% | 12% | 12.4 | ○ | ○ | ○ |
| B2 | 95.3 | — | 12% | 12% | 12% | 25.6 | ○ | ○ | ○ |
| C1 | 12.1 | 4 | 12% | 5% | 3% | 3.3 | x | x | ○ |
| C2 | 54.3 | 25 | 12% | 5% | 5% | 6.7 | x | ○ | ○ |
| D1 | 15.9 | 11 | 12% | 5% | 3% | 2.3 | x | x | x |
| D2 | 0.0 | 0 | 12% | 5% | 3% | 3.6 | x | x | ○ |
| E1 | 90.9 | — | 12% | 12% | 12% | 16.9 | ○ | ○ | ○ |
| E2 | 90.4 | — | 12% | 12% | 12% | 17.2 | ○ | ○ | ○ |
| | | | | | | Detection rate | 60% | 70% | 90% |

In the example illustrated in Table 1, a=70%, b=15 times, C1=12%, C2=5%, and C3=3%. As is clear from Table 1, for first and second times of each of the subjects C and D whose initial ratio of deep blinking was less than 70%, with the related art in which the threshold value was set to 12% uniformly, the drowsiness could not be detected even if drowsiness was felt. With respect to this, it was found that the drowsiness detection device 1 according to the first embodiment could detect the drowsiness at the second time of the subject C and the detection accuracy of drowsiness was improved. It was found that, with the drowsiness detection device 1B according to the second embodiment, drowsiness could be detected at the first and second times of the subject C and the second time of the subject D, and the detection accuracy of drowsiness was further improved. It was found that, when using the equation (2) and n=9, the detection results of the first and second times of the subject C and the first and second times of the subject D were as follows: the threshold value of the first time of the subject C was (9/33)×12.1%=3.3, the threshold value of the second time of the subject C was 10.6, the threshold value of the first time of the subject D was 2.1, and the threshold value of the second time of the subject D could not be calculated and if a smaller limit value (for example, 3) was set, a detection rate was 90%, and thus the accuracy was improved.

The present invention is not limited to the embodiments described above and can be appropriately modified, improved and the like. In addition, materials, shapes, sizes, numbers, arrangement positions and the like of components in the embodiments described above are freely selected and are not limited as long as the present invention can be implemented.

According to the embodiments described above, a time period ratio % during which the driver closes the eye within the certain time period Ta is calculated as the drowsiness index value, but the present invention is not limited thereto. A time period product during which the driver closes the eye within the certain time period Ta may be calculated as the drowsiness index value.

According to the embodiments described above, the control unit 3 detects the start of driving when the ignition switch is turned on, and resets the threshold value of the drowsiness detection, but the present invention is not limited thereto. For example, there is also a case in which the driver is replaced while the engine is applied, and thus when a reset operation (the predetermined trigger) of the driver is performed, the threshold value of the drowsiness detection may be reset, or after the start of driving, the threshold value may be remeasured every certain time period, and the threshold value may be updated when there is a change.

According to the embodiments described above, the certain time period Ta for calculating the PERCLOS is the same as the certain time period Ta for calculating the ratio of deep blinking and the number of times of blinking, but the present invention is not limited thereto, and the two may be different time periods.

Here, characteristics of the embodiments of the drowsiness detection device and the drowsiness detection method according to the present invention described above will be briefly summarized and listed in [1] to [6] below.

[1] A drowsiness detection device (1), including:
an imaging unit (2) configured to image a face of a detection target person;
a first calculation unit (33) configured to calculate, based on an image imaged by the imaging unit (2), a drowsiness index value that is a time period during which the detection target person closes an eye within a first predetermined time period or a value according to the time period;
a drowsiness detection unit (34) configured to detect drowsiness of the detection target person in a case in which the drowsiness index value is equal to or larger than a threshold value;
a second calculation unit (36) configured to calculate, based on the image imaged by the imaging unit (2), a total number of times of blinking in which an opening/closing degree of the eye is equal to or less than a first predetermined value within a second predetermined time period;
a third calculation unit (37) configured to calculate, based on the image imaged by the imaging unit (2), a number of times of deep blinking in which the opening/closing degree of the eye is equal to or less than a second predetermined value that is less than the first predetermined value within the second predetermined time period;
a fourth calculation unit (38) configured to calculate a ratio of deep blinking, which is a ratio of the number of times of deep blinking to the total number of times of blinking; and
a threshold value setting unit (35) configured to set the threshold value based on an initial ratio of deep blinking calculated first after a predetermined trigger.

According to the configuration of the above [1], the threshold value suitable for the driver can be set, and the detection accuracy of drowsiness can be improved.

[2] The drowsiness detection device (1) according to [1], in which
the threshold value setting unit (35) is configured to set the threshold value to be smaller in a case in which the initial ratio of deep blinking is less than a third predetermined value than in a case in which the initial ratio of deep blinking is equal to or larger than the third predetermined value.

According to the configuration of the above [2], the person who performs shallow blinking has an initial ratio of deep blinking that is less than the third predetermined value, and thus the threshold value can be set to be smaller than the threshold value corresponding to the person who blinks generally. Accordingly, the threshold value suitable for the driver can be set, and the detection accuracy of drowsiness can be further improved.

[3] The drowsiness detection device (1) according to [1], in which
the threshold value setting unit (35) is configured to set the threshold value based on the initial ratio of deep blinking and an initial number of times of deep blinking calculated first after the predetermined trigger.

According to the configuration of the above [3], the threshold value suitable for the driver can be set, and the detection accuracy of drowsiness can be further improved.

[4] The drowsiness detection device (1) according to [3], in which
the threshold value setting unit (35) is configured to
set the threshold value to be smaller in a case in which the initial ratio of deep blinking is less than a third predetermined value than in a case in which the initial ratio of deep blinking is equal to or larger than the third predetermined value, and
set the threshold value to be smaller in a case in which the initial ratio of deep blinking is less than the third predetermined value and the initial number of times of deep blinking is less than a predetermined number of times than in a case in which the initial ratio of deep blinking is less than the third predetermined value and the initial number of times of deep blinking is equal to or larger than the predetermined number of times.

According to the configuration of the above [4], a person who has a small number of times of blinking belongs to those whose number of times of blinking is less than the predetermined number of times, and the threshold value can be set to be smaller as compared with a person who has a large number of times of blinking. Accordingly, the detection accuracy of drowsiness can be further improved.

[5] The drowsiness detection device (1) according to any one of [1] to [4], in which
a detection of a start of driving is the predetermined trigger.

According to the configuration of the above [5], the threshold value can be determined based on an initial drowsiness index value close to that in the case of awakening, and the detection accuracy of drowsiness can be further improved.

[6] A drowsiness detection method including
a first calculation step for calculating, based on an image of a face of a detection target person imaged by an imaging unit (2), a drowsiness index value that is a time period during which the detection target person closes an eye within a first predetermined time period or a value according to the time period;
a drowsiness detection step for detecting drowsiness of the detection target person in a case in which the drowsiness index value is equal to or larger than a threshold value;
a second calculation step for calculating, based on the image imaged by the imaging unit (2), a total number of times of blinking in which an opening/closing degree of the eye is equal to or less than a first predetermined value within a second predetermined time period;
a third calculation step for calculating, based on the image imaged by the imaging unit (2), a number of times of deep blinking in which the opening/closing degree of the eye is equal to or less than a second predetermined value that is less than the first predetermined value within the second predetermined time period;
a fourth calculation step for calculating a ratio of deep blinking, which is a ratio of the number of times of deep blinking to the total number of times of blinking; and
a threshold value setting step for setting the threshold value based on an initial ratio of deep blinking calculated first after a predetermined trigger.

According to the configuration of the above [6], the threshold value suitable for the driver can be set, and the detection accuracy of drowsiness can be improved.

What is claimed is:

1. A drowsiness detection device comprising:
an imaging unit configured to image a face of a detection target person;
a first calculation unit configured to calculate, based on an image imaged by the imaging unit, a drowsiness index value that is a time period during which the detection target person closes an eye within a first predetermined time period or a value according to the time period;
a drowsiness detection unit configured to detect drowsiness of the detection target person in a case that the drowsiness index value is equal to or larger than a threshold value;
a second calculation unit configured to calculate, based on an image imaged by the imaging unit, a total number of times of blinking in which an opening/closing degree of the eye is equal to or less than a first predetermined value within a second predetermined time period;
a third calculation unit configured to calculate, based on an image imaged by the imaging unit, a number of times of deep blinking in which the opening/closing degree of the eye is equal to or less than a second predetermined value that is less than the first predetermined value within the second predetermined time period;
a fourth calculation unit configured to calculate a ratio of deep blinking, which is a ratio of the number of times of deep blinking to the total number of times of blinking; and
a threshold value setting unit configured to set the threshold value based on an initial ratio of deep blinking calculated first after a predetermined trigger.

2. The drowsiness detection device according to claim 1, wherein
when the initial ratio of deep blinking is less than a third predetermined value, the threshold value setting unit is configured to set the threshold value to be smaller than in a case that the initial ratio of deep blinking is equal to or larger than the third predetermined value.

3. The drowsiness detection device according to claim 1, wherein
the threshold value setting unit is configured to set the threshold value based on the initial ratio of deep blinking and an initial number of times of deep blinking calculated first after the predetermined trigger.

4. The drowsiness detection device according to claim 3, wherein
the threshold value setting unit is configured to
set the threshold value to be smaller than in a case that the initial ratio of deep blinking is equal to or larger than the third predetermined value when the initial ratio of deep blinking is less than a third predetermined value, and
set the threshold value to be smaller than in a case that the initial ratio of deep blinking is less than the third predetermined value and the initial number of times of deep blinking is equal to or larger than the predetermined number of times when the initial ratio of deep blinking is less than the third predetermined value and the initial number of times of deep blinking is less than a predetermined number of times.

5. The drowsiness detection device according to claim 1, wherein
a detection of a start of driving is the predetermined trigger.

6. A drowsiness detection method comprising:
calculating based on an image of a face of a detection target person imaged by an imaging unit, a drowsiness index value that is a time period during which the detection target person closes an eye within a first predetermined time period or a value according to the time period;
detecting drowsiness of the detection target person in a case in which the drowsiness index value is equal to or larger than a threshold value;
calculating, based on the image imaged by the imaging unit, a total number of times of blinking in which an opening/closing degree of the eye is equal to or less than a first predetermined value within a second predetermined time period;
calculating, based on the image imaged by the imaging unit, a number of times of deep blinking in which the opening/closing degree of the eye is equal to or less than a second predetermined value that is less than the first predetermined value within the second predetermined time period;
calculating a ratio of deep blinking, which is a ratio of the number of times of deep blinking to the total number of times of blinking; and
setting the threshold value based on an initial ratio of deep blinking calculated first after a predetermined trigger.

* * * * *